United States Patent
Zhang

(10) Patent No.: US 10,484,877 B2
(45) Date of Patent: Nov. 19, 2019

(54) SYSTEM AND METHOD FOR A CUSTOMIZED FIFTH GENERATION (5G) NETWORK

(71) Applicant: Huawei Technologies Co., Ltd., Shenzhen (CN)

(72) Inventor: Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/702,428

(22) Filed: Sep. 12, 2017

(65) Prior Publication Data
US 2018/0014204 A1   Jan. 11, 2018

Related U.S. Application Data

(62) Division of application No. 14/639,572, filed on Mar. 5, 2015, now Pat. No. 9,788,211.

(60) Provisional application No. 61/994,626, filed on May 16, 2014, provisional application No. 61/948,507, filed on Mar. 5, 2014.

(51) Int. Cl.
*H04W 16/14* (2009.01)
*H04M 15/00* (2006.01)
(Continued)

(52) U.S. Cl.
CPC ............. *H04W 16/14* (2013.01); *H04L 12/14* (2013.01); *H04L 41/12* (2013.01);
(Continued)

(58) Field of Classification Search
CPC ....... H04W 88/16; H04W 8/26; H04W 76/10; H04W 88/06
(Continued)

(56) References Cited

U.S. PATENT DOCUMENTS

| 2007/0106992 A1 | 5/2007 | Kitamura |
| 2008/0020776 A1 | 1/2008 | Deshpande et al. |

(Continued)

FOREIGN PATENT DOCUMENTS

| CN | 102209024 A | 10/2011 |
| CN | 102904794 A | 1/2013 |

(Continued)

OTHER PUBLICATIONS

3GPP TSG-SA Plenary Meeting #63 SP-140122,"Consideration on NFV Standardization in 3GPP," Liu Hong, China Mobile, Mar. 5-7, 2014, 10 pages.
(Continued)

*Primary Examiner* — Sam Bhattacharya
(74) *Attorney, Agent, or Firm* — Slater Matsil, LLP

(57) ABSTRACT

An embodiment logical function architecture for next-generation 5G wireless networks may include a control plane comprising a software defined topology (SDT) logical entity configured to establish a virtual data-plane logical topology for a service, a software defined resource allocation (SDRA) logical entity configured to map the virtual data-plane topology to a physical data-plane for transporting service-related traffic over the wireless network, and a software defined per-service customized data plane process (SDP) logical entity configured to select transport protocol(s) for transporting the service-related traffic over a physical data-plane of the wireless network. An embodiment virtual service specific serving gateway (v-s-SGW) for next-generation 5G networks may be assigned specifically to a service being provided by a group of wirelessly enabled devices, and may be responsible for aggregating service-related traffic communicated by the group of wirelessly enabled devices.

15 Claims, 9 Drawing Sheets

(51) Int. Cl.
*H04L 12/713* (2013.01)
*H04L 12/24* (2006.01)
*H04L 12/14* (2006.01)
*H04W 4/24* (2018.01)
*H04W 64/00* (2009.01)

(52) U.S. Cl.
CPC ........ *H04L 41/5054* (2013.01); *H04L 45/586* (2013.01); *H04M 15/00* (2013.01); *H04M 15/31* (2013.01); *H04M 15/44* (2013.01); *H04M 15/58* (2013.01); *H04M 15/61* (2013.01); *H04M 15/765* (2013.01); *H04M 15/8044* (2013.01); *H04W 4/24* (2013.01); *H04M 15/66* (2013.01); *H04W 64/00* (2013.01)

(58) Field of Classification Search
USPC ........... 455/428, 432.2, 435.1, 454; 370/328, 370/331
See application file for complete search history.

(56) References Cited

U.S. PATENT DOCUMENTS

| | | |
|---|---|---|
| 2009/0191906 A1 | 7/2009 | Abedi |
| 2011/0131252 A1 | 6/2011 | Son et al. |
| 2011/0246669 A1 | 10/2011 | Kanada et al. |
| 2012/0054347 A1 | 3/2012 | Lee et al. |
| 2013/0188515 A1 | 7/2013 | Pinheiro et al. |
| 2013/0282579 A1 | 10/2013 | Palnitkar et al. |
| 2013/0301473 A1 | 11/2013 | Huang et al. |
| 2014/0020102 A1* | 1/2014 | Srinivasan .............. H04L 41/00 726/23 |
| 2014/0307556 A1 | 10/2014 | Zhang |
| 2014/0362730 A1 | 12/2014 | Zhang et al. |

FOREIGN PATENT DOCUMENTS

| | | |
|---|---|---|
| EP | 2482502 A2 | 8/2012 |
| JP | 2009545247 A | 12/2009 |
| JP | 2011113571 A | 6/2011 |
| JP | 2011210032 A | 10/2011 |
| JP | 2013522965 A | 6/2013 |
| KR | 20130004497 A | 1/2013 |
| WO | 2008018051 A2 | 2/2008 |
| WO | 2011112683 A1 | 9/2011 |

OTHER PUBLICATIONS

Shimonishi, H et al., "Virtualized Network Infrastructure Using OpenFlow", 2010 IEEE/IFIP Network Operations and Management Symposium Workshops, Apr. 13-23, 2010, pp. 74-79, Osaka, Japan.
NEC, "Discussion on NFV Relationship to 3GPP" [online], 3GPP TSG SA #63, SP-140095, Fukuoka, Japan, Mar. 4, 2014, 11 pages.

* cited by examiner

SYSTEM AND METHOD FOR A CUSTOMIZED FIFTH GENERATION (5G) NETWORK

This patent application is a divisional of U.S. Non-Provisional application Ser. No. 14/639,572 filed on Mar. 5, 2015 and entitled "System and Method for a Customized Fifth Generation (5G) Network," which claims priority to U.S. Provisional Application No. 61/948,507, filed on Mar. 5, 2014 and entitled "5G Radio Access Network Architecture (Software Defined RAN)," and to U.S. Provisional Application No. 61/994,626, filed on May 16, 2014 and entitled "System and Method for a Customized 5G Network," all of which are hereby incorporated by reference herein as if reproduced in their entireties.

TECHNICAL FIELD

The present invention relates to a system and method for wireless communications, and, in particular embodiments, to a system and method for a customized fifth generation (5G) network.

BACKGROUND

Fifth Generation (5G) wireless networks may represent a major paradigm shift from previous wireless networks. For example, 5G wireless networks may utilize high carrier frequencies with unprecedented numbers of antennas. Moreover, 5G wireless networks may be highly integrative, tying any potentially new 5G air interface together with LTE and WiFi to provide universal high-rate coverage with a seamless user experience. 5G wireless networks may also include densely deployed heterogeneous radio access networks (RANs) having macro base stations and low power nodes that are inter-connected via wireless access mesh backhaul networks.

SUMMARY

Technical advantages are generally achieved, by embodiments of this disclosure which describe systems and methods for a customized fifth generation (5G) network.

In accordance with an embodiment, a method for providing control functions in next-generation wireless networks is provided. In this example, the method includes establishing a virtual data-plane logical topology for a service by a software defined topology (SDT) logical entity, mapping the virtual data-plane topology to a physical data-plane for transporting service-related traffic over a wireless network, by a software defined resource allocation (SDRA) logical entity, and selecting transport protocol(s) for transporting the service-related traffic over a physical data-plane of the wireless network by a software defined per-service customized data plane process (SDP) logical entity.

In accordance with another embodiment, a method for establishing a virtual gateway is provided. In this example, the method includes instantiating a first virtual user-specific serving gateway (v-u-SGW) on a network device, and assigning a first local v-u-SGW ID to the first v-u-SGW. The network device is assigned a host identifier (ID). Different v-u-SGWs on the network device are assigned different local v-u-SGW IDs. The method further includes configuring routing parameters in the network so that packets specifying both the host ID and the first local v-u-SGW ID are forwarded to the first v-u-SGW.

In accordance with another embodiment, a method for routing traffic is provided. In this example, the method comprises receiving a traffic flow from an upstream network node. The traffic flow is destined for a user equipment (UE) associated with a virtual user-specific serving gateway (v-u-SGW) instantiated on a network device. The method further includes identifying address information specified by the service-related traffic, and forwarding the traffic flow to a downstream network node in accordance with the address information. The address information indicates a host ID assigned to the network device and a local ID assigned to the v-u-SGW.

In accordance with yet another embodiment, a method for managing network services is provided. In this example, the method includes identifying a service being provided to a group of wirelessly-enabled devices. The group of wirelessly-enabled devices includes user equipments (UEs), machine-to-machine (M2M) devices, or combinations thereof. The method further includes assigning a virtual service specific serving gateway (v-s-SGW) to the service. The v-s-SGW is responsible for aggregating service-related traffic communicated by the group of UEs.

In accordance with yet another embodiment, a method for location tracking is provided. In this example, the method includes identifying user equipments (UEs) positioned in wireless networks, and tracking locations of the UEs via a device location tracking as a service (LTaaS) layer. The locations of the UEs are dynamically updated as the UEs move to different locations in the wireless networks. A first one of the UEs is positioned in a first wireless network. Tracking the locations of the UEs via the LTaaS layer comprises determining that the first UE is nearby a first network device in the first wireless network, and updating a central control center in the LTaaS layer to indicate that the first UE is located nearby the first network device in the first wireless network.

In accordance with yet another embodiment, a method for content caching is provided. In this example, the method includes sensing the popularity of available content by a content forwarding service manager (CFM). The available content is stored in one or more application servers. The method further includes selecting, from the available content, content for caching in an information-centric networking (ICN) virtual network (VN) based on the popularity of the available content; and prompting the selected content to be forwarded to a network device in a radio access network (RAN) of a wireless network. The network device comprises a virtual ICN server of the ICN VN. The network device is adapted to provide the selected content to a virtual user-specific serving gateway (v-u-SGW) of a served user equipment (UE) upon request.

In accordance with yet another embodiment, another method for content caching is provided. In this example, the method includes receiving content at a network device in a wireless network. The network device comprises a virtual information-centric networking (ICN) server of a ICN virtual network (VN). The method further includes caching the content in an ICN format, receiving a content request from a virtual user-specific serving gateway (v-u-SGW) of a served UE, and forwarding the content in the ICN format to the v-u-SGW. The v-u-SGW is adapted to translate the selected content from the ICN format to a user-specific format before relaying the translated content to the served UE.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
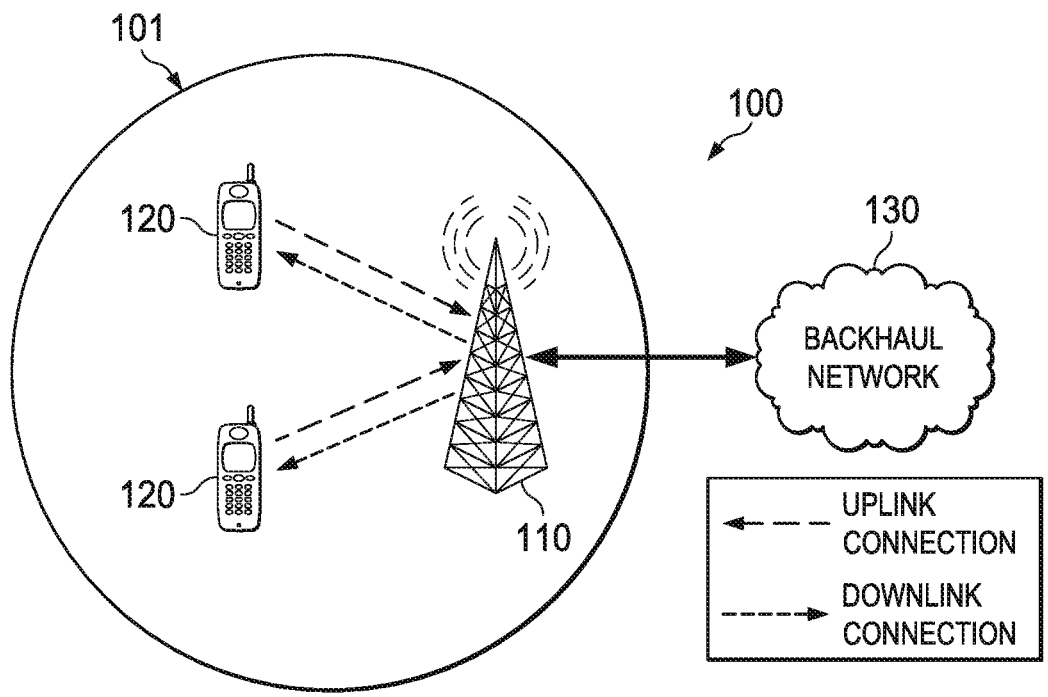
FIG. 1 illustrates a diagram of an embodiment wireless communications network.

The structure, manufacture and use of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. As used herein, the term "wireless network" refers to a network adapted to provide wireless access to wirelessly enabled devices. A wireless network may include multiple network-side devices connected by wireless and/or wireline links, and may include multiple network domains, e.g., multiple radio access networks (RANs), one or more evolved packet core (EPC) networks, etc. Unless otherwise specified, the term "wireless network" does not imply that the network is currently providing wireless access. For example, a wireless network may be offline (e.g., for maintenance, etc.). As another example, the wireless network may be online without presently serving any users.

Aspects of this disclosure provide an embodiment logical function architecture for next-generation 5G wireless networks. The logical function architecture includes a data plane, a control plane, and a management plane. The control plane includes a software defined topology (SDT) logical entity configured to establish a virtual data-plane logical topology for a service, a software defined resource allocation (SDRA) logical entity configured to map the virtual data-plane topology to a physical data-plane for transporting service-related traffic over the wireless network, and a software defined per-service customized data plane process (SDP) logical entity configured to select transport protocol(s) for transporting the service-related traffic over a physical data-plane of the wireless network. The management plane may include entities for performing various management related tasks. For example, the management plane may include an infrastructure management entity adapted to manage spectrum sharing between different radio access networks (RANs) and/or different wireless networks, e.g., wireless networks maintained by different operators. The management plane may also include one or more of a data and analytics entity, a customer service management entity, a connectivity management entity, and a content service management entity, which are described in greater detail below.

Aspects of this disclosure further provide a virtual service specific serving gateway (v-s-SGW) for next-generation 5G networks. The v-s-SGW is assigned specifically to a service being provided by a group of wirelessly enabled devices, and is responsible for aggregating service-related traffic communicated by the group of wirelessly enabled devices. In an embodiment, the v-s-SGW provides access protection for the service-related traffic by encrypting/decrypting data communicated over bearer channels extending between the v-s-SGW and the wirelessly-enabled devices. The v-s-SGW may also provide a layer two (L2) anchor point between the group of wirelessly-enabled devices. For example, the v-s-SGW may provide convergence between the different wireless communication protocols used by the wirelessly-enabled devices, as well as between different wireless networks and/or RANs being access by the wirelessly-enabled devices. Additionally, the v-s-SGW may perform at least some application layer processing for the service related traffic communicated by the wirelessly-enabled devices. Aspects of this disclosure further provide an embodiment device naming structure. For the v-s-SGW. Specifically, a v-s-SGW initiated on a network device is assigned a local v-u-SGW ID. Outgoing packets from the v-u-SGW ID include the local v-u-SGW ID and a host ID of the network device. Accordingly, recipients of those outgoing packets can learn the local v-u-SGW ID and the host ID associated with a particular v-s-SGW, and thereafter send packets to the v-s-SGW by including the local v-u-SGW ID and the host ID in the packet header.

Aspects of this disclosure further provide location tracking as a service (LTaaS) for next-generation 5G networks. The LTaaS feature may track locations of user equipments (UEs) via a device location tracking as a service (LTaaS) layer such that locations of the UEs are dynamically updated in a LTaaS layer as the UEs move to different locations in the wireless networks. In some embodiments, the LTaaS layer consists of a centralized control center. In other embodiments, the LTaaS layer consists of a set of distributed control centers positioned in the wireless network, e.g., an application installed on a network device, such as a gateway or AP. In yet other embodiments, the LTaaS layer comprises both a central controller center and regional control centers. In such embodiments, the central control center may be updated periodically by the regional control centers, which may monitor UE movement in their respective wireless networks. In embodiments, the LTaaS layer may monitor general locations of the UEs. For example, the LTaaS layer may associate the UE's location with a network device in a specific wireless network, e.g., an access point, a serving gateway (SGW), etc.

Aspects of this disclosure also provide content caching techniques for next-generation 5G wireless networks. Specifically, content may be cached in network devices of wireless network or radio access network (RAN) in anticipation that a mobile device or user will want to access the content in the future. In some embodiments, a content forwarding service manager (CFM) may select content to be pushed to a caching location in the wireless network based on the popularity of available content stored in one or more application servers. The network device may comprise a virtual information-centric networking (ICN) server of a ICN virtual network (VN), and may be adapted to provide the cached content to a virtual user-specific serving gateway (v-u-SGW) of a served user equipment (UE) upon request. Notably, the cached content is stored by the network device in an information-centric networking (ICN) format, and the v-u-SGW may translate the cached content from the ICN format to a user-specific format upon receiving the cached content pursuant to a content request. The v-u-SGW may then relay the cached content having the user-specific format to a served UE. After the content is pushed to the network device, the content forwarding service manager (CFM) may update a content cache table to indicate that the content has been cached at the network device. The content cache table may associate a name of the content with a network address of the network device or the virtual WN server included in the network device. The ICN VN may be transparent to the served UE, and may be operated by one of the wireless network operators or a third party. These and other aspects are described in greater detail below.

FIG. 1 illustrates a network 100 for communicating data. The network 100 comprises an access point (AP) no having a coverage area 101, a plurality of mobile devices 120, and a backhaul network 130. As shown, the AP no establishes uplink (dashed line) and/or downlink (dotted line) connections with the mobile devices 120, which serve to carry data from the mobile devices 120 to the AP no and vice-versa. Data carried over the uplink/downlink connections may include data communicated between the mobile devices 120, as well as data communicated to/from a remote-end (not shown) by way of the backhaul network 130. As used herein, the term "access point (AP)" refers to any component (or collection of components) configured to provide wireless access to a network, such as an enhanced base station (eNB), a macro-cell, a femtocell, a Wi-Fi access point (AP), or other wirelessly enabled devices. APs may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with an AP, such as a user equipment (UE), a mobile station (STA), and other wirelessly enabled devices. In some embodiments, the network 100 may comprise various other wireless devices, such as relays, low power nodes, etc.

Figure 2:
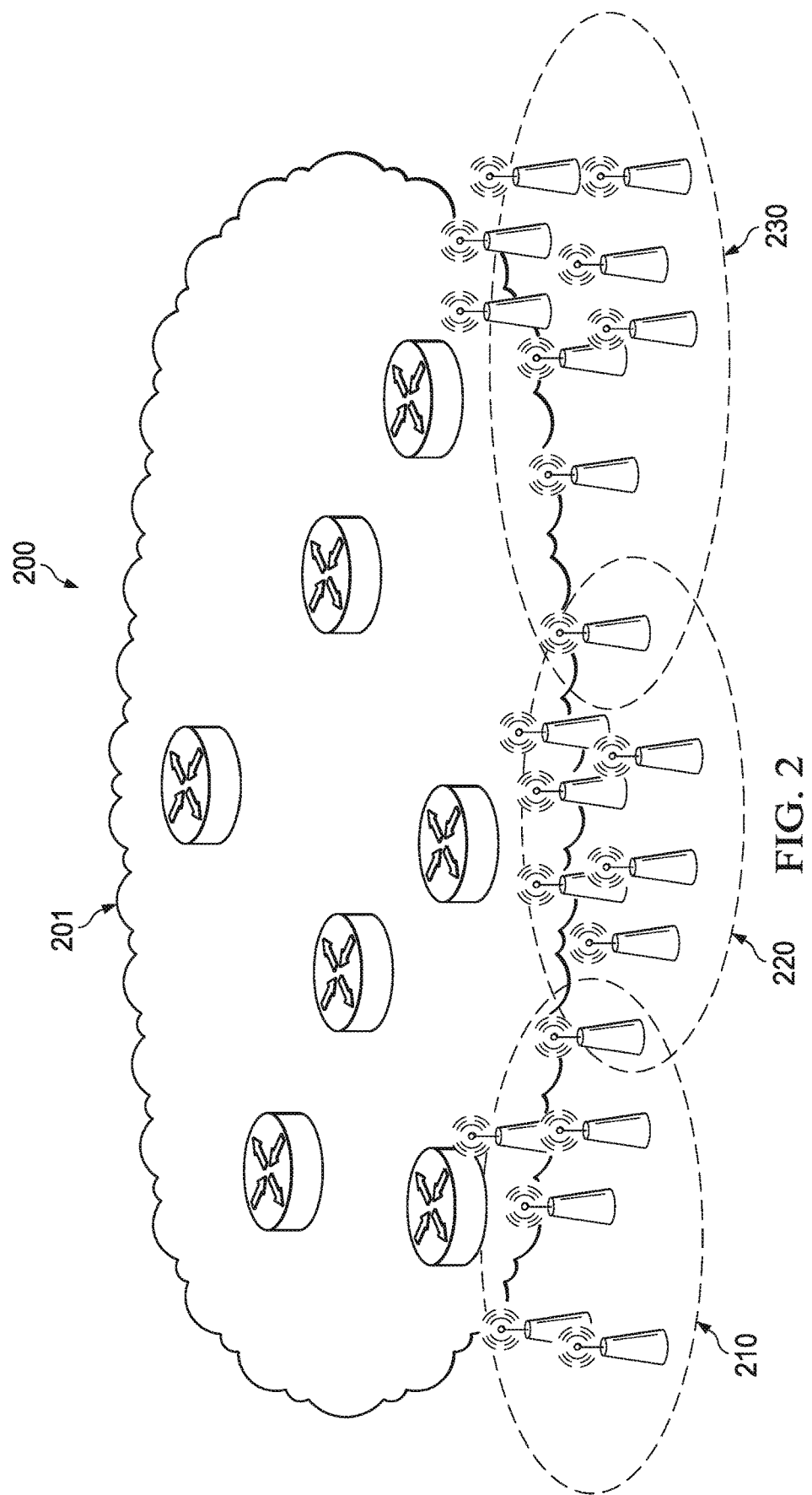
FIG. 2 illustrates a diagram of an embodiment 5G network architecture.

Embodiments of this disclosure may be implemented in 5G wireless networks that include multiple radio access network (RANs). FIG. 2 illustrates an embodiment 5G network architecture 200 comprising a wireless network domain 201 serving multiple radio access networks (RANs) 210, 220, 230. The wireless network domain 201 may include various gateway devices, e.g., packet data network (PDN) gateways, serving gateways (SGWs), while each of the RANs 210, 220, 230 may include one or more access points (APs), e.g., macro-base stations, low power nodes, etc.

Figure 3:
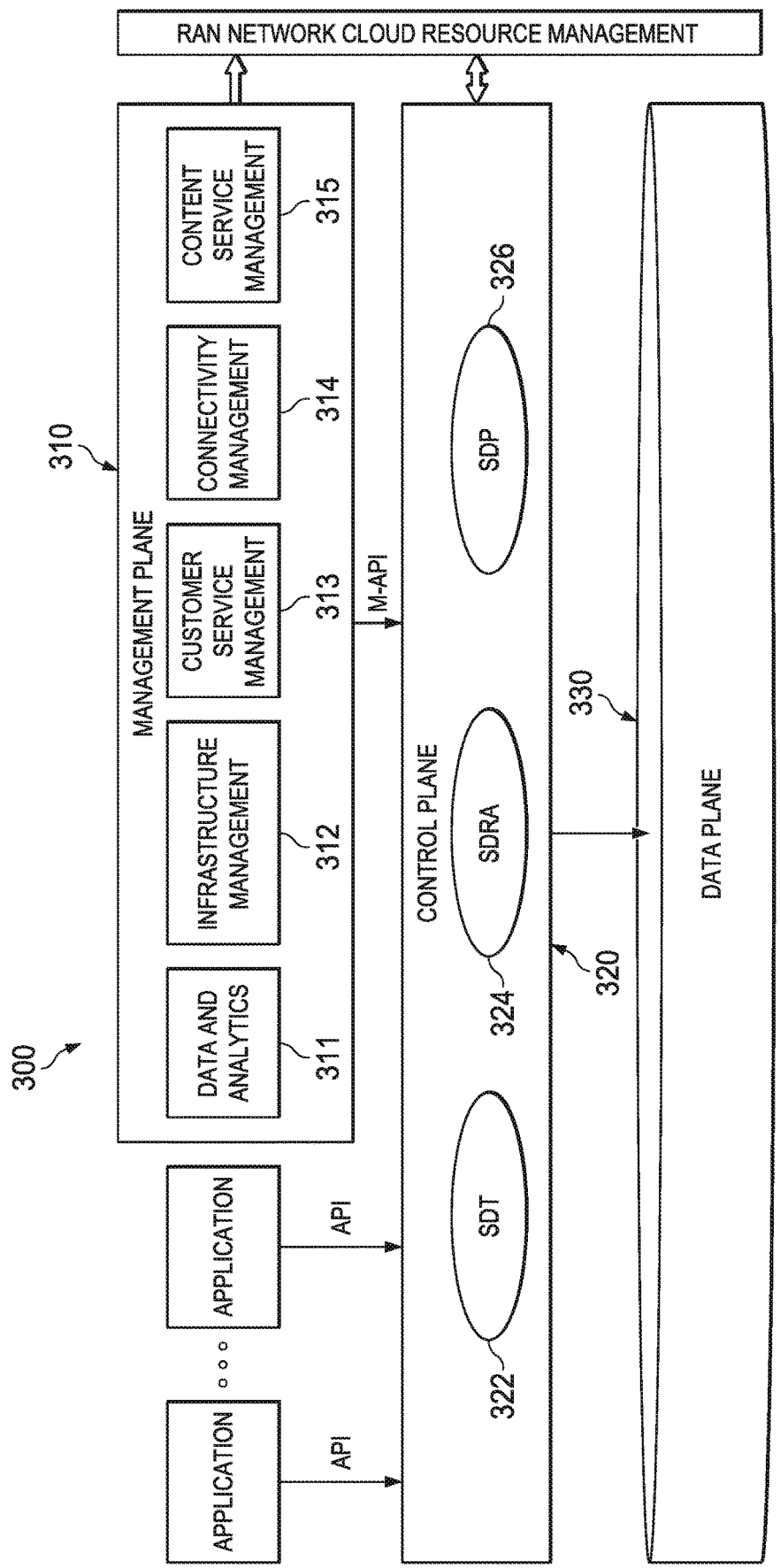
FIG. 3 illustrates a diagram of embodiment logical function architecture for next-generation 5G wireless networks.

Aspects of this disclosure provide an embodiment logical function architecture for next-generation 5G wireless networks. FIG. 3 illustrates an embodiment logical function architecture 300 for next-generation 5G wireless networks.

As shown, the embodiment logical function architecture 300 comprises a management plane 310, a control plane 320, and a data plane 330.

The management plane 310 may include entities for performing various management related tasks. In this example, the management plane 330 includes a data and analytics entity 311, an infrastructure management entity 312, customer service management entity 313, a connectivity management entity 314, and a content service management entity 315. The data and analytics entity 311 is configured to provide data analytics as a service (DAaaS). This may include manage on-demand network status analytics and on-demand service QoE status analytics for a particular service, and providing a data analytics summary to a client. The infrastructure management entity 312 may manage spectrum sharing between different radio access network (RANs) in a wireless network, or between wireless networks maintained by different operators. This may include wireless network integration, management of RAN backhaul and access link resources, coordination of spectrum sharing among co-located wireless networks, access management, air interface management, and device access naming and network node naming responsibilities.

The customer service management entity 313 may provide customer service functions, including managing customer context information, service-specific quality of experience (QoE) monitoring, and charging responsibilities. The connectivity management entity 314 may provide location tracking as a service (LTaaS) over the data plane of the wireless network. The connectivity management entity 314 may also have other responsibilities, such as establishing customized and scenario aware location tracking scheme, establishing software defined and virtual per-mobile user geographic location tracking schemes, and triggering user specific data plane topology updates. The content service management entity 315 may manage content caching in the wireless network. This may include selecting content to be cached in RAN, selecting caching locations, configuring cache capable network nodes, and managing content forwarding. In some embodiments, the management plane may also include a security management entity that is responsible for network access security (e.g., service-specific security, customer device network access protection, etc.), as well as inter-domain and intra-domain wireless network security.

The control plane 320 may include entities for performing various control related tasks. In this example, the control plane includes a software defined topology (SDT) logical entity 322, a software defined resource allocation (SDRA) logical entity 324, and a software defined per-service customized data plane process (SDP) logical entity 326. The SDT entity 322, the SDRA logical entity 324, and the SDP logical entity 326 may collectively configure a service-specific data plane for carrying service-related traffic. More specifically, the software defined topology (SDT) logical entity 322 is configured to establish a virtual data-plane logical topology for a service. This may include selecting network devices to provide the service from a collection of network devices forming the data plane 330. The software defined resource allocation (SDRA) logical entity 324 is configured to map the virtual data-plane topology to a physical data-plane for transporting service-related traffic over the wireless network. This may include mapping logical links of the virtual data-plane topology to physical paths of the data plane. The software defined per-service customized data plane process (SDP) logical entity 326 is configured to select transport protocol(s) for transporting the service-related traffic over a physical data-plane of the wireless network. The transport protocols may be selected based on various criteria. In one example, the SDP logical entity selects the transport protocol based on a characteristic of the service-related traffic, e.g., business characteristic, payload volume, quality of service (QoS) requirement, etc. In another example, the SDP logical entity selects the transport protocol based on a condition on the network, e.g., loading on the data paths, etc.

The SDT entity 322, the SDRA logical entity 324, and the SDP logical entity 326 may have other responsibilities beyond their respective roles in establishing a service-specific data plane. For example, the SDT entity 322 may dynamically define key functionality for v-s-SGWs/v-u-SGWs, as well as enable mobile VN migration and provide mobility management services. As another example, the SDRA logical entity 324 may embed virtual network sessions, as well as provide radio transmission coordination. One or both of the SDT entity 322 and the SDRA logical entity 324 may provide policy and charging rule function (PCRF) services.

As discussed above, the SDT entity 322, the SDRA logical entity 324, and the SDP logical entity 326 may collectively configure a service-specific data plane for carrying service-related traffic. Specifically, the SDT entity 322 establishes a virtual data-plane logical topology for the service, the SDRA logical entity 324 maps the virtual data-plane topology to a physical data-plane path for transporting service-related traffic over the wireless network, and the SDP logical entity 326 select transport protocol(s) for transporting the service-related traffic over the physical data-plane.

Figure 4:
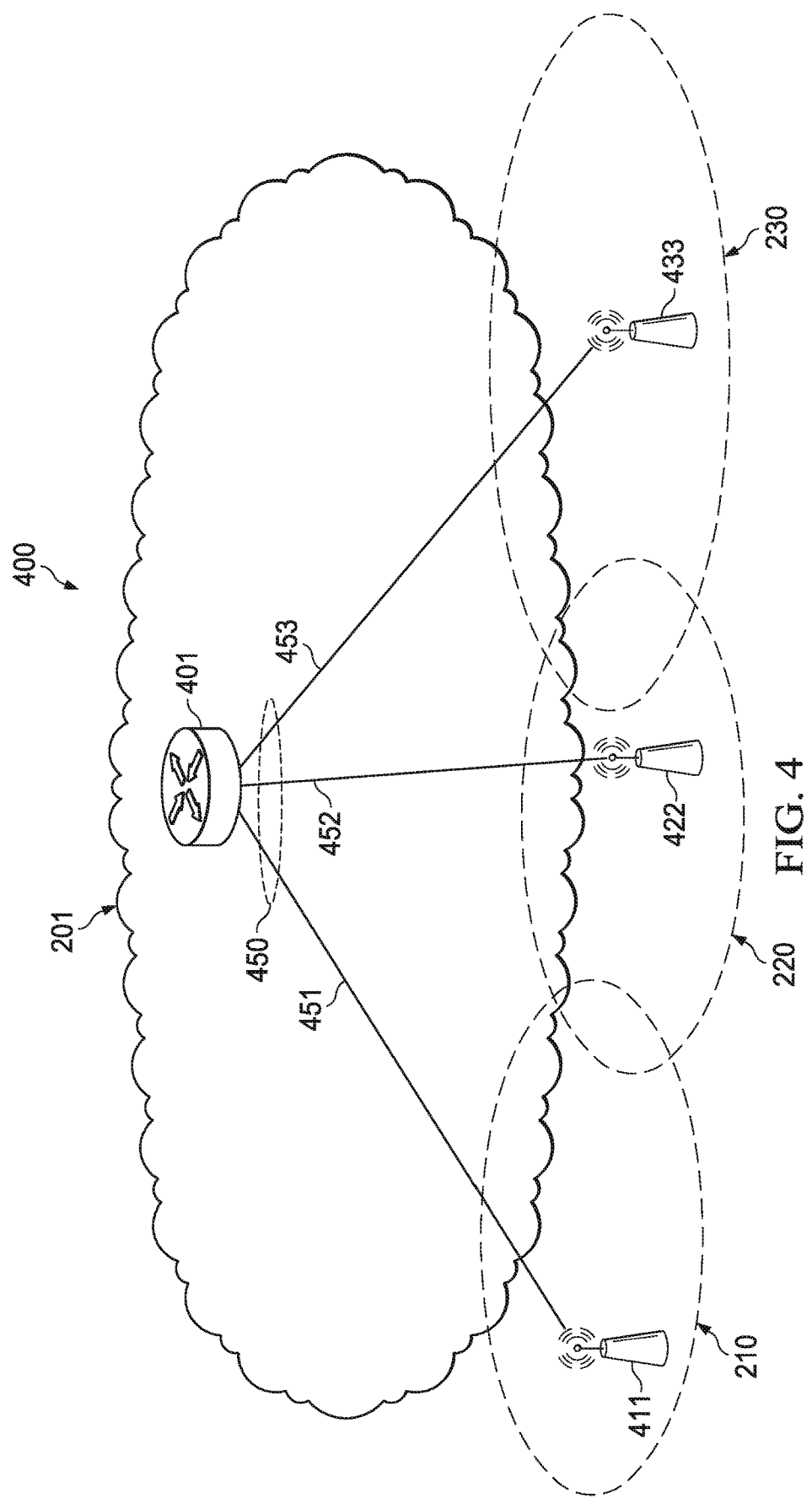
FIG. 4 illustrates a diagram of a virtual data-plane logical topology established over the embodiment 5G network architecture depicted in FIG. 2.

FIG. 4 illustrates a diagram 400 depicting a virtual data-plane logical topology 450 established for a service over the embodiment 5G network architecture illustrated in FIG. 2. As shown, the virtual data-plane logical topology 450 includes a series of logical links 451, 542, 543 extending between network devices 411, 422, and 433 adapted to provide the service. In this example, a virtual service specific serving gateway (v-s-SGW) 401 is responsible for aggregating service-related traffic communicated between the network devices 411, 422, and 433. In some embodiments, the SDP logical entity 326 may establish the virtual data-plane logical topology 450 by selecting the network devices 411, 422, and 433 to provide the service, as well as the v-s-SGW 401 for aggregating the service related traffic.

Figure 5:
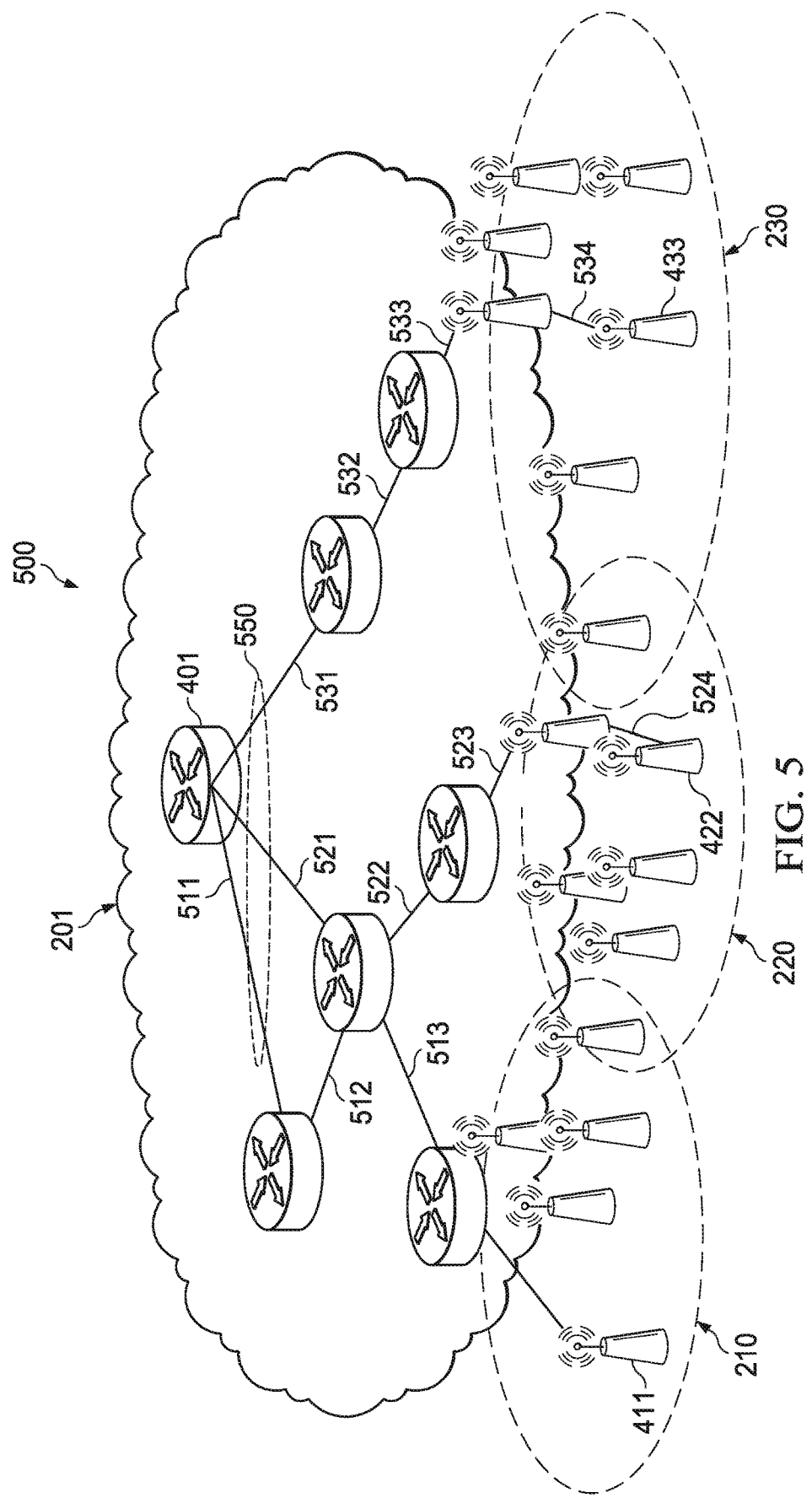
FIG. 5 illustrates a diagram of a physical data-plane 550 topology established over the embodiment 5G network architecture depicted in FIG. 2

FIG. 5 illustrates a diagram 500 depicting a physical data-plane 550 for transporting service-related traffic over the embodiment 5G network architecture illustrated in FIG. 2. As shown, the physical data-plane 550 includes physical paths 511-513, 521-524, and 531-534 extending between the v-s-SGW 401 and the network nodes 411, 422, and 433 configured to provide the service. In this example, the physical paths 511-513 were mapped to the logical link 451, the physical paths 521-524 were mapped to the logical link 542, and the physical paths 531-534 were mapped to the logical link 543.

Figure 6A:
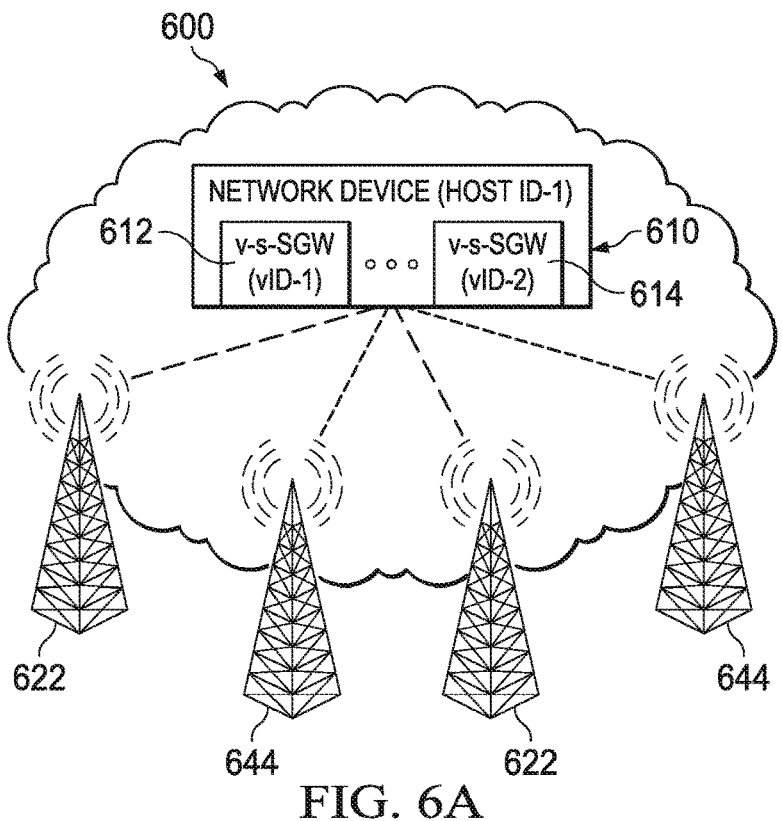
FIGS. 6A-6B illustrate embodiment 5G network architectures that demonstrate naming structures for virtual SGWs.

Aspects of this disclosure provide a naming structure for v-s-SGWs in next-generation 5G wireless networks. FIG. 6A illustrates an embodiment 5G network architecture 600 that includes v-s-SGWs 612, 614 assigned to aggregate service-specific traffic. As shown, the v-s-SGWs 612, 614 are instantiated on a network device 610. The v-s-SGWs 612, 614 are assigned to different services. Specifically, the v-s-SGWs 612 is assigned to a service being provided or accessed by the devices 622, and the v-s-SGWs 614 is assigned to a service being provided or accessed by the devices 644. While the devices 622, 644 are depicted as access points (APs), it should be appreciated that any network device may be selected to access or provide a service, e.g., user equipments (UE), machine-to-machine (M2M) devices, sensors, etc. The v-s-SGWs 612, 614 are assigned different local v-s-SGW identifiers (IDs). In this example, the v-s-SGW 612 is assigned a first local v-s-SGW ID (vID-1), and the v-s-SGW 614 is assigned a second local v-s-SGW ID (vID-2). The local v-s-SGW IDs may be used, in combination with an ID assigned to the network device 610 (host ID-1), to communicate with the v-s-SGWs 612, 614. For example, a packet (e.g., data, control, management, or otherwise) specifying the host ID and the vID-1 may be routed to the v-s-SGW 612, while a packet specifying the host ID and the vID-2 may be routed to the v-s-SGW 614.

Figure 6B:
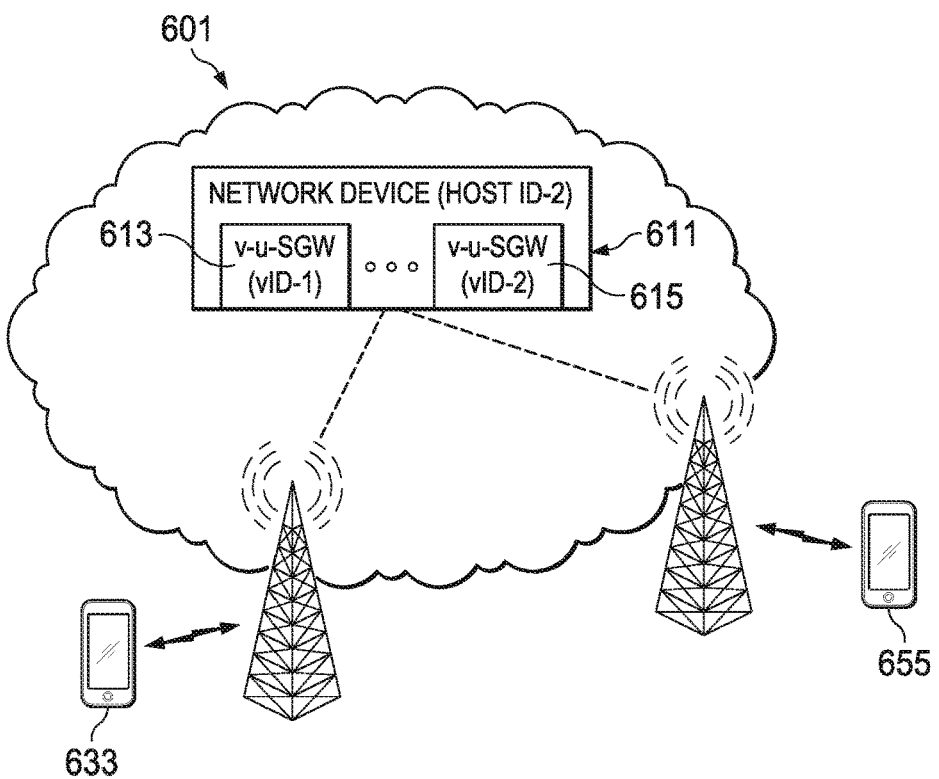

Aspects of this disclosure further provide a naming structure for v-u-SGWs in next-generation 5G wireless networks. FIG. 6B illustrates an embodiment 5G network architecture 600 that includes v-u-SGWs 613, 615 assigned to UEs 633, 655 (respectively). The v-u-SGWs 613, 615 are instantiated on a network device 611, and are assigned different local v-u-SGW identifiers (IDs). In this example, the v-u-SGW 613 is assigned a third local v-u-SGW ID (vID-3), and the v-u-SGW 615 is assigned a fourth local v-u-SGW ID (vID-2). The local v-u-SGW IDs may be used, in combination with an ID assigned to the network device 611 (host ID 2), to communicate with the v-u-SGWs 613, 615.

Figure 7:
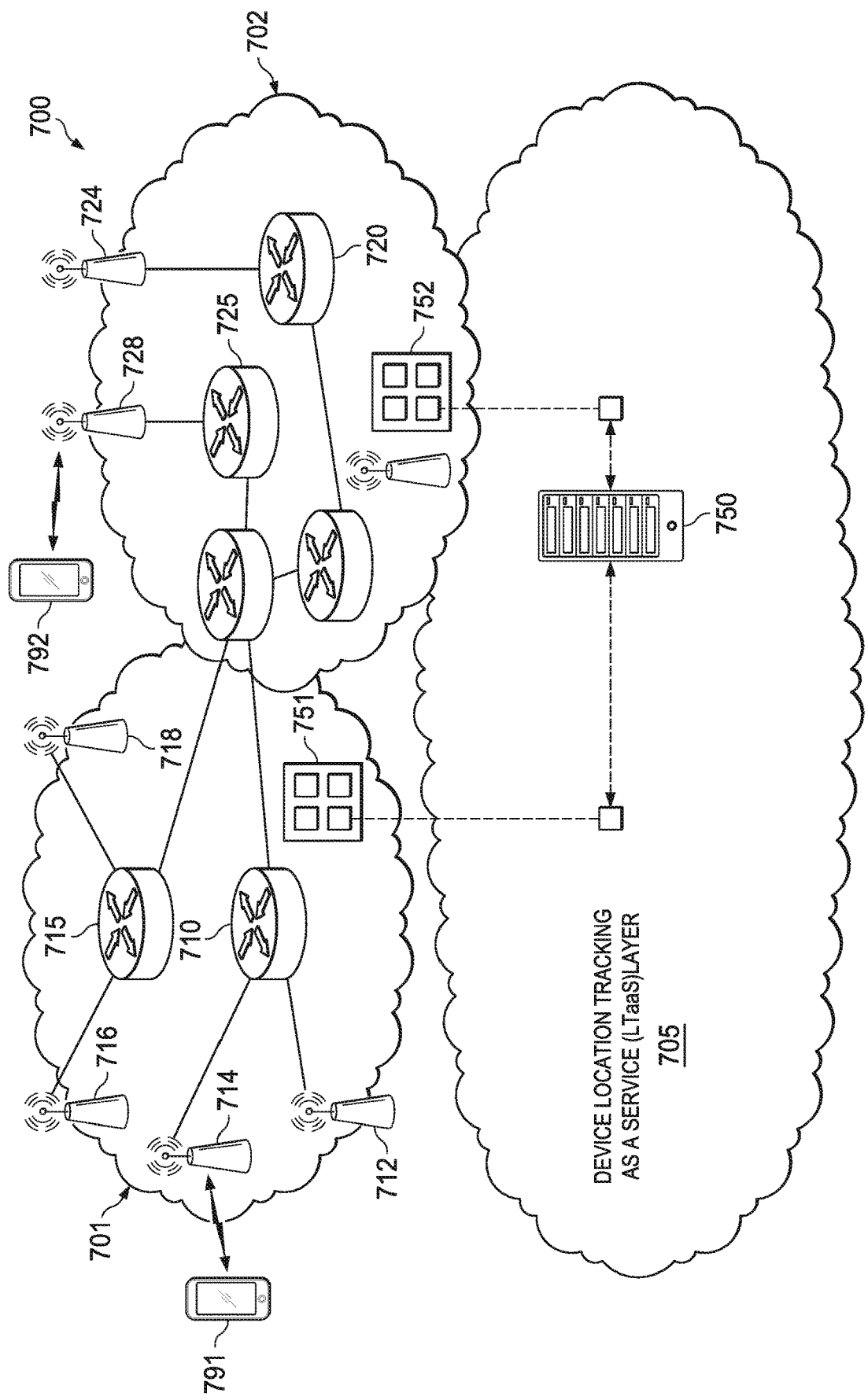
FIG. 7 illustrates a diagram of an embodiment 5G network architecture for providing location tracking as a service (LTaaS)

Aspects of this disclosure further provide location tracking as a service for next-generation 5G networks. FIG. 7 illustrates an embodiment 5G network architecture 700 for providing location tracking as a service (LTaaS). As shown, the embodiment 5G network architecture 700 comprises network domains 701, 702, and an LTaaS layer 705. The network domain 701 includes a plurality of gateways 710, 715 and a plurality of APs 712, 714, 716, 718. Likewise, the network domain 702 includes a plurality of gateways 720, 725 and a plurality of APs 724, 728. The gateways 710, 715, 720, 725 may include any network gateway e.g., virtual serving gateways (vSGWs) in a radio access network (RAN), SGWs or PGWs in an evolved packet core (EPC), etc.

In this example, the LTaaS layer 705 includes a central control center 750 and regional control centers 751, 752 positioned in the network domains 701, 702 (respectively). In other examples, the LTaaS layer 705 may be completely centralized such that it only includes central control center 750, or completely distributed such that it only includes the regional control centers 751, 752.

The LTaaS layer 705 may track the position of UEs 791, 792 as they migrate throughout the network domains 701, 702 by monitoring the relative locations of the UEs 791, 792 to network components (e.g., the gateways 710, 715, 720, 725, the APs 712, 714, 716, 718, 724, 728, etc.) in the network domains 701, 702. The granularity with which the LTaaS layer 705 monitors the position of the UEs 791, 792 may vary across different embodiments. In one embodiment, the LTaaS layer 705 monitors the position of the UEs 791, 792 in relation to the APs 712, 714, 716, 718, 724, 728. In such an embodiment, the LTaaS layer 705 may be updated when a UE migrates from one AP to another, e.g., the UE 791 migrates from the AP 714 to the AP 712. In another embodiment, the LTaaS layer 705 monitors the position of the UEs 791, 792 in relation to the gateways 710, 715, 720, 725. In such an embodiment, the LTaaS layer 705 may be updated when a UE migrates between APs associated with different gateways, but not when a UE migrates between APs associated with the same gateway. By way of example, the LTaaS layer 705 may be updated when the UE 791 migrates from the AP 714 to the AP 716, as that would require re-associating the UE 791 with the gateway 715. However, no update may be triggered when the UE 791 migrates from the AP 714 to the AP 712, as those APs are both associated with the gateway 710. In yet another embodiment, the LTaaS layer 705 monitors the position of the UEs 791, 792 in relation to the network domains 701, 702. In such an embodiment, the LTaaS layer 705 may be updated when a UE migrates between wireless network domains, but not when a UE migrates between different APs in the same network domain. For example, the LTaaS layer 705 may be updated when the UE 792 migrates from the AP 728 to the AP 718, but not when the UE 792 migrates from the AP 728 to the AP 724.

In yet another embodiment, there may be two layers of LTaaS tracking. For example, the regional datacenters 751 may track the location of the UEs 791, 792 with relation to a network device in the wireless network domains 701, 702, and the central datacenter 750 may track which wireless network domain the UEs 791, 792 are attached. In other embodiments, the central datacenter 750 may store a carbon copy of the location tables maintained by the regional data centers 751, 752.

Figure 8:
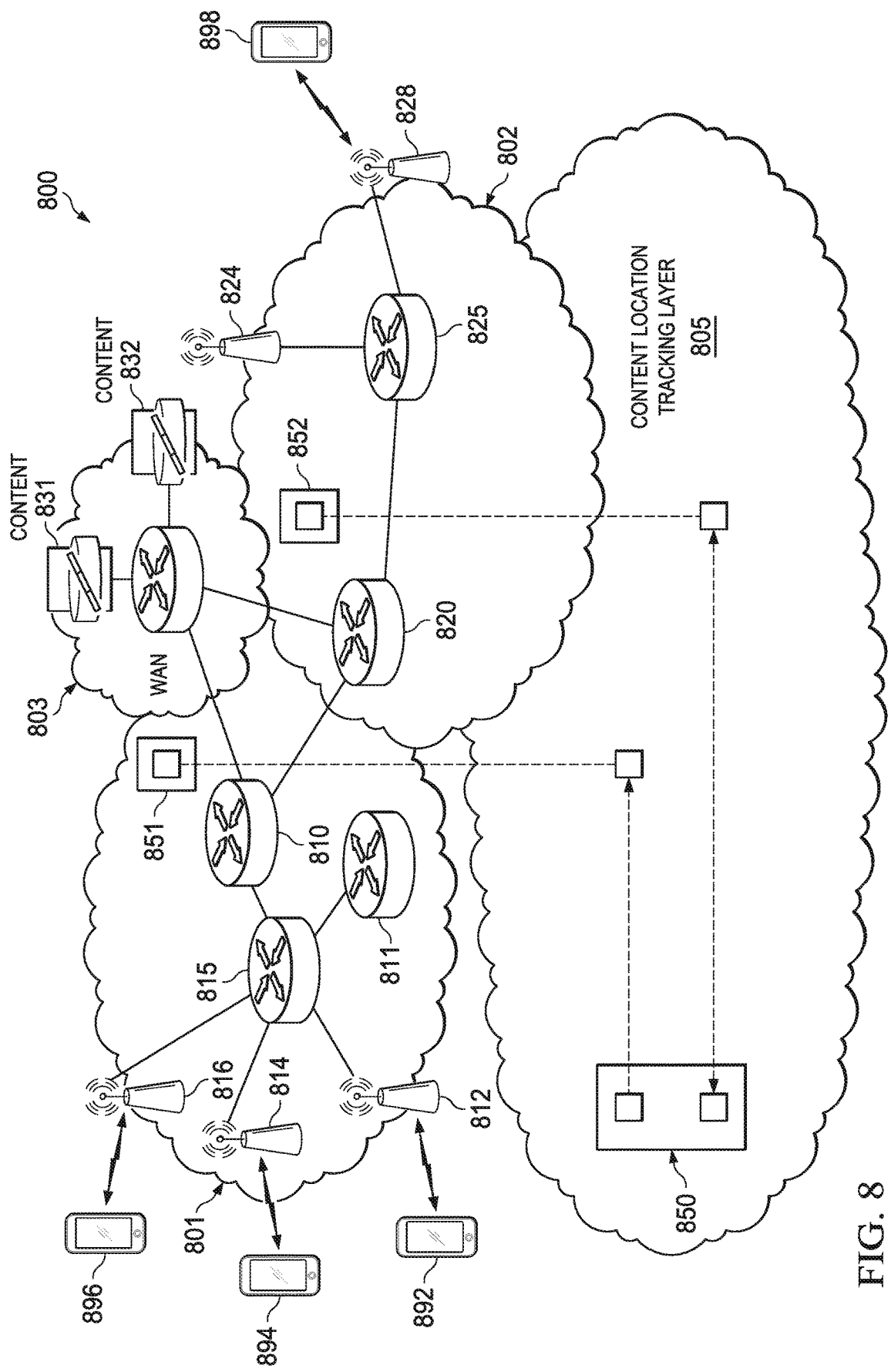
FIG. 8 illustrates a diagram of an embodiment 5G network architecture for content caching.

Aspects of this disclosure also provide content caching techniques for next-generation 5G wireless networks. FIG. 8 illustrates an embodiment 5G network architecture 800 adapted for content caching. As shown, the embodiment 5G network architecture 800 comprises network domains 801, 802, a wide area network (WAN) 803, and a content location tracking layer 805. The network domain 801 includes caching capable network devices 810, 811 a gateway 815, and a plurality of APs 812, 814, 816, 818. Likewise, the network domain 802 includes a caching capable network device 820, a gateway 825, and a plurality of APs 824, 828. The network devices 810, 815, 820, 825 may include any network device, such as a gateway.

Content stored in application servers 831, 832 may be pushed from the WAN 803 to the caching capable network devices 810, 811, 820 in the wireless network domains 801, 802 by content forwarding service managers (CFMs) instantiated on the regional control centers 851, 852 (respectively). For example, the CFMs may sense the popularity of available content stored on the application servers 831, 832, and then prompt popular content to be pushed to one or more of the caching capable network devices 810, 811, 820. In some embodiments, content may also be cached in one or more of the gateways 815, 825 and/or APs 812, 814, 816, 818.

The caching capable network devices 810, 811, 820 may comprise virtual information-centric networking (ICN) servers of a ICN virtual network (VN), which may be transparent to the UEs 892, 894, 896, 898. The ICN VN may be operated by one of the wireless network operators or a third party. The caching capable network devices 810, 811, 820 may be adapted to provide cached content to a virtual user-specific serving gateway (v-u-SGW) of a served user equipment (UE) upon request. The v-u-SGWs may be instantiated on the gateways 815, 825. Notably, the cached content may be stored by the caching capable network devices 810, 811, 820 in an information-centric networking (ICN) format, and the v-u-SGWs may translate the cached content from the ICN format to a user-specific format prior to sending it to one or more of the UEs 892, 894, 896, 898 that requested the content. After the content is pushed to the network device, the content forwarding service managers (CFM) may update content cache tables in the regional control centers 851, 852 to indicate which network components in the wireless network domains 801, 802 are caching the content. In some embodiments, a central control center 850 in the content location tracking layer 805 may store a central version of the content cache tables maintained at the regional control centers 851, 852. The content cache tables may associate a name of the content with a network address of the network device or the virtual WN server included in the network device.

An embodiment system and method provide a 5G network referred to herein as MyNET, which is customized to consumers. MyNET includes network architecture and logical functionality architecture.

An embodiment architecture for a customized network, MyNET, provides for machine-to-machine (M2M) communication, private social networking, virtual network migration, security architecture, content in-radio access network (RAN), confederation network, customer location tracking as a service, network status analytics as a service, service delivery quality of experience (QoE) statistics as a service, device/mobile/user naming architecture, transport protocol, etc. The data plane of each MyNET network may be customized on a per-service basis. The RAN network has a service traffic aware data plane topology. Virtual service-specific serving gateways (v-s-SGWs) may be created on-demand, and dynamically configured based on machine distributions and traffic characteristics.

Virtual mobile user-specific SGWs (v-u-SGW) and connectivity manager (v-u-CM) may be migrated to different network devices. Customized location tracking schemes are provided. Location tracking as a service is enabled. The v-u-SGWs' location and functionality are dynamically configured. The mobile's relative location (RL) is tracked.

A virtual service-specific SGW (v-s-SGW) may be independent from the public social network, and may provide service privacy. The v-s-SGW may be assigned to various services, such as video conferencing.

Aspects of this disclosure provide MyNET end-customer ad-hoc network support as an extension of the wireless network infrastructure. The MyNET end-customer ad-hoc network may have a customer ad-hoc network-aware data plane architecture. The WN operator (WNO) may configure one or more ad-hoc virtual cloud SGWs (v-c-SGWs) to forward/aggregate traffic of end-customers in the cloud to the ad-hoc cloud GWs.

FIG. 13 illustrates embodiment MyNET support of content-centric network. Cache-in-RAN is controlled by content service (CS) control. Selective network nodes (NN) (CC-capable NN) are configured with store-and-forward and late binding functions. Content location is transparent to content consumers (v-u-SGW forwards interest/request to local CS controller or closest CC-node). The WNO communicates with content location resolution layer to get the content name-location info. WNO keeps the content name cache—CC-node address information in RAN.

Embodiment MyNET security architectures may provide multiple layer network access protection. Embodiment MyNET security architectures user/device specific and non-user specific wireless access protection. Preliminary WN access protection material is kept in all edge nodes, independent from customer device (WN-specific), and provides preliminary WN access protection. Secondary WN protection materials are kept in v-u-SGW, are user/device specific, and provide stronger WN access protection. The customer equipment obtains WN network access key materials to gain access. VN access materials are kept at edge GW of VN or v-u-SGW and provide VN-specific protection.

Cooperative energy saving mode utilizes surrounding active devices/network to relay location update message and paging message. The VN may be active or idle. WN operators manage mobile MAC state and state transition, manage active VN and idle VN and transition, and manage customized access MAP. Corporation and collaboration of multiple geographically co-located and disjointed networks are developed by same or different operators. The device is independent from the operators. Device location tracking uses cooperation and control (customer LTaaS). WNO registers the location to global control center when a customer enters its WN and the corresponding GW address. WNO retrieves a WN name where a mobile customer currently is for data forwarding purposes. A global unique user/device name does not change during movement. The network access ID (PHYID/MACID) is local RAN-unique and is updated during movement. It is fully decoupled with internet protocol (IP).

For each device/UE/user (one user can have multiple devices), device naming registration (global) is done offline, and PHYID or network access ID is done on-line and is unique within a local area. For v-u-SGW of each user/device, the naming structure includes the network address of the network node where the v-u-SGW locates, and a V-u-SGW ID (unique within the network node) are used. For any network nodes, the naming structure includes intra-location RAN: NN ID (unique within a local RAN), and boundary node (Unique ID and global ID/IP address) are used. For each segment of a data path, the following can be used to identify a flow: flow ID, destination node NA/sub-flow ID, or destination Node IP/QoS, etc. Flow ID is unique within a local RAN/core. Destination Node NA is unique within a local RAN/core. Sub-flow ID is unique within a device.

Figure 9:
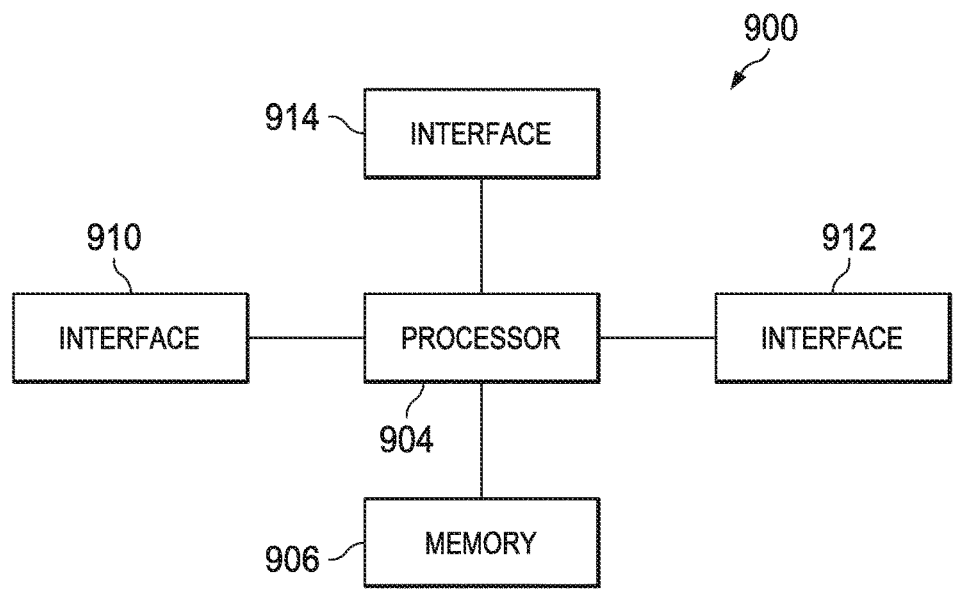
FIG. 9 illustrates a diagram of an embodiment communications device.

FIG. 9 illustrates a block diagram of an embodiment of a communications device 900, which may be equivalent to one or more devices (e.g., UEs, NBs, etc.) discussed above. The communications device 900 may include a processor 904, a memory 906, and a plurality of interfaces 910, 912, 914, which may (or may not) be arranged as shown in FIG. 9. The processor 904 may be any component capable of performing computations and/or other processing related tasks, and the memory 906 may be any component capable of storing programming and/or instructions for the processor 904. The interfaces 910 may be any component or collection of components that allows the communications device 900 to communicate with other devices.

Figure 10:
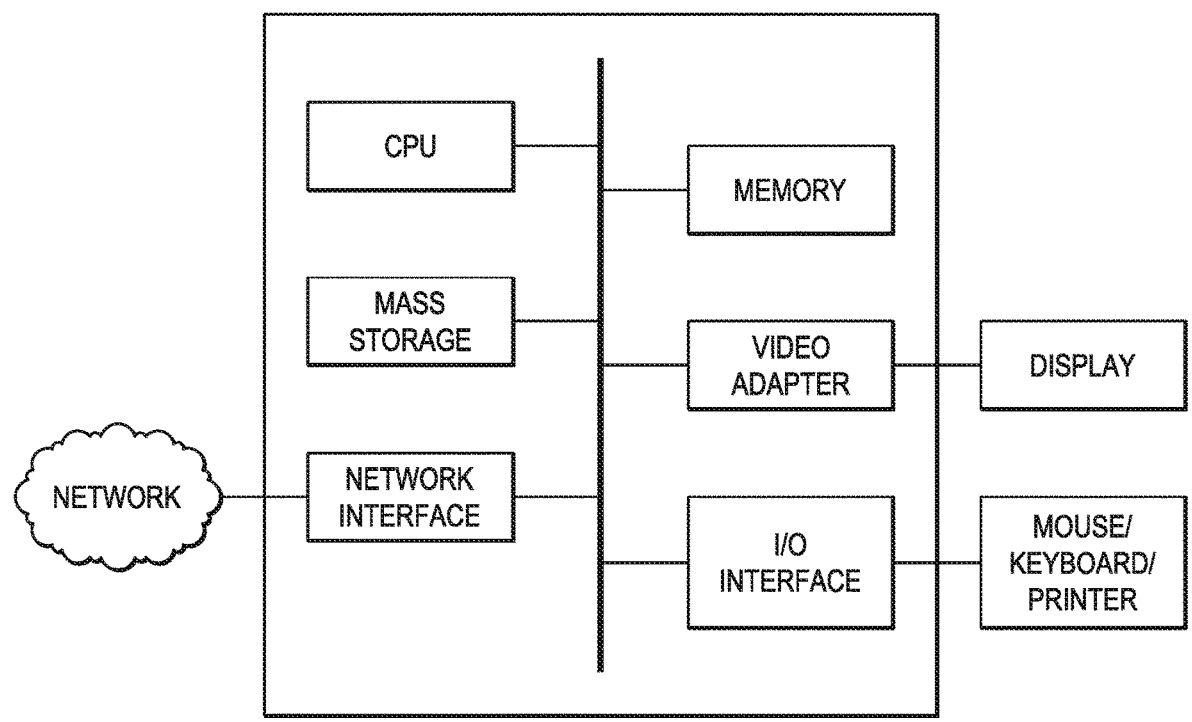
FIG. 10 illustrates a diagram of an embodiment computing platform.

FIG. 10 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

With reference to the above discussions, there is provided an embodiment method that comprises the steps of establishing, by a software defined topology (SDT) logical entity, a virtual data-plane logical topology for a service; mapping, by a software defined resource allocation (SDRA) logical entity, the virtual data-plane topology to a physical data-plane for transporting service-related traffic over a wireless network; and selecting, by a software defined per-service customized data plane process (SDP) logical entity, transport protocol(s) for transporting the service-related traffic over a physical data-plane of the wireless network.

In a further embodiment, establishing the virtual data-plane topology comprises selecting network devices to provide the service from a collection of network devices forming the physical data plane. Optionally, mapping the virtual data-plane topology to the physical data-plane comprises mapping logical links of the virtual data-plane topology to physical paths of the physical data-plane, wherein the logical links extend between the network devices selected to provide the service. In a further optional embodiment, selecting the transport protocol(s) for transporting the service-related traffic over the physical data-plane comprises selecting the transport protocol(s) in accordance with a characteristic of the service related traffic.

In another embodiment, the method further comprises managing, by an infrastructure management entity, spectrum sharing between different radio access network (RANs) in the wireless network. The method of this embodiment may further comprise managing, by the infrastructure management entity, spectrum sharing between multiple wireless networks. In another further embodiment, the method may comprise providing, by a data and analytics entity, data analytics as a service. In another embodiment, the method may comprise charging, by a customer service management entity, clients for utilization of the data plane in accordance with a service agreement. In another embodiment, the method may comprise providing, by a connectivity management entity, location tracking as a service (LTaaS) over the data plane of the wireless network. In another embodiment, the method may comprise managing, by a content service management entity, content caching in the data plane of the wireless network.

With reference to the above discussions, there is provided an embodiment method for establishing a virtual gateway. The method comprises instantiating a first virtual user-specific serving gateway (v-u-SGW) on a network device, wherein the network device is assigned a host identifier (ID); assigning a first local v-u-SGW ID to the first v-u-SGW, wherein different v-u-SGWs on the network device are assigned different local v-u-SGW IDs; and configuring routing parameters in the network so that packets specifying both the host ID and the first local v-u-SGW ID are forwarded to the first v-u-SGW.

In a further embodiment, the method may further comprise instantiating a second v-u-SGW on the network device, wherein the first v-u-SGW and the second v-u-SGW are associated with different user equipment; and assigning a second local v-u-SGW ID to the second v-u-SGW, wherein packets specifying both the host ID and the second local v-u-SGW ID are forwarded to the second v-u-SGW. In an embodiment, the network device is a network device in a radio access network. In an embodiment, the network device is a network device in an evolved packet core (EPC) network.

With reference to the above discussions, there is provided an embodiment method for routing traffic. The method comprises receiving, by a first network device, a traffic flow from an upstream network node, the traffic flow being destined for a user equipment (UE) associated with a virtual user-specific serving gateway (v-u-SGW) instantiated on a network device; identifying address information specified by the service-related traffic; and forwarding the traffic flow to a downstream network node in accordance with the address information, wherein the address information indicates a host ID assigned to the network device and a local ID assigned to the v-u-SGW.

In a further embodiment, the local ID is assigned to the v-u-SGW by the network device.

With reference to the above discussions, there is provided an embodiment method. The method comprises identifying a service being provided to a group of wirelessly-enabled devices, the group of wirelessly-enabled devices including user equipments (UEs), machine-to-machine (M2M) devices, or combinations thereof; and assigning a virtual service specific serving gateway (v-s-SGW) to the service, wherein the v-s-SGW is responsible for aggregating service-related traffic communicated by the group of UEs.

In an embodiment, the v-s-SGW provides access protection for the service-related traffic communicated over bearer channels extending between the v-s-SGW and wirelessly-enabled devices in the group of wirelessly-enabled devices. In an embodiment, the v-s-SGW provides a layer two (L2) anchor point between the group of wirelessly-enabled devices. In an embodiment, at least some wirelessly-enabled devices in the group of wirelessly-enabled devices utilize different wireless communication protocols than one another, and wherein the v-s-SGW provides a layer two (L2) anchor point for convergence between the different wireless communication protocols. In an embodiment, at least some wirelessly-enabled devices in the group of wirelessly-enabled devices are positioned in different radio access networks (RANs), and wherein the v-s-SGW provides a layer two (L2) anchor point for multi-RAN convergence between the different RANs. In an embodiment, the application layer processing performed by the v-s-SGW is configured by a client. In an embodiment, the application layer processing performed by the v-s-SGW is configured by an operator.

In an embodiment, the v-s-SGW performs at least some application layer processing for the service related traffic. Optionally, the v-s-SGW computes at least some statistical information corresponding to the service related traffic, and communicates the statistical information in control messages to UEs in the group of UEs, application servers in the one or more application servers, or combinations thereof.

With reference to the above discussions, there is provided an embodiment method for location tracking, the method comprising: identifying user equipments (UEs) positioned in wireless networks; and tracking locations of the UEs via a device location tracking as a service (LTaaS) layer, wherein the locations of the UEs are dynamically updated as the UEs move to different locations in the wireless networks, wherein a first one of the UEs is positioned in a first wireless network, and wherein tracking the locations of the UEs via the LTaaS layer comprises determining that the first UE is nearby a first network device in the first wireless network, and updating a control center in the LTaaS layer to indicate that the first UE is located nearby the first network device in the first wireless network.

In an embodiment, the LTaaS layer is operated by at least one operator of the wireless networks. In an embodiment, the LTaaS layer is operated by a third party that is different than operator(s) of the wireless networks. In an embodiment, the LTaaS layer comprises a central control center that is independent from the wireless networks. In an embodiment, the first network device comprises an access point in the first wireless network. In an embodiment, the LTaaS layer comprises distributed regional controllers located in the wireless networks.

In an embodiment, the first network device comprises a serving gateway (SGW) in the first wireless network. In an embodiment, the first UE is in a second wireless network that is separate from the first wireless network, and wherein the method further comprises: sending an update from the central control center in the LTaaS layer to a regional control center in the second wireless network, the update indicating that the first UE is located nearby the first network device in the first wireless network, wherein the regional control center in the second wireless network is adapted to notify the second UE of a relative location of the first UE upon request. Optionally, the second wireless network is operated by a different network operator than the first wireless network.

In an embodiment, a first one of the UEs is positioned in a first wireless network, and wherein tracking the locations of the UEs via the LTaaS layer comprises determining that the first UE has migrated to a position nearby a first network device in the first wireless network; and updating a first regional control center in the first wireless network to indicate that the first UE is located nearby the first network device in the first wireless network. Optionally, a second one of the UEs is positioned in a second wireless network that is separate from the first wireless network, and wherein the method further comprises: sending an update from the first regional control center to a second regional control center in the second wireless network, the update indicating that the first UE is located nearby the first network device in the first wireless network, wherein the regional control center in the second wireless network is adapted to notify the second UE of a relative location of the first UE upon request.

In an embodiment, the method further comprises receiving a request for location information of the first UE from a third party operator; and sending a response indicating a relative location of the first UE to the third party operator. Optionally, the third party operator operates a network resource over which traffic destined for the first UE is being transported. Optionally, the third party operator is a virtual operator.

With reference to the above discussions, there is provided an embodiment method for content caching. The method comprises sensing, by a content forwarding service manager (CFM), the popularity of available content, the available content being stored in one or more application servers; selecting, from the available content, content for caching in an information-centric networking (ICN) virtual network (VN) based on the popularity of the available content; and prompting the selected content to be forwarded to a network device in a radio access network (RAN) of a wireless network, the network device comprising a virtual ICN server of the ICN VN, wherein the network device is adapted to provide the selected content to a virtual user-specific serving gateway (v-u-SGW) of a served user equipment (UE) upon request.

In an embodiment, the selected content is stored by the network device in an information-centric networking (ICN) format. Optionally, the v-u-SGW is adapted to translate the selected content from the ICN format to a user-specific format before relaying the content having the user-specific format to the served UE. In some embodiments, the user-specific format comprises an internet protocol (IP) format.

In an embodiment, the method further comprises updating a content cache table stored in the CFM to indicate that the selected content has been cached by the network device. Optionally, the content cache table associates a name of the content with a network address of the virtual WN server.

In an embodiment, the ICN VN is transparent to the served UE. In another embodiment, the ICN VN is operated by an operator of the wireless network. In an embodiment, the ICN VN is operated by a third party operator that is different than an operator of the wireless network.

With reference to the above discussions, there is provided an embodiment method for content caching, the method comprising: receiving content at a network device in a wireless network, wherein the network device comprises a virtual information-centric networking (ICN) server of a ICN virtual network (VN); caching the content in an ICN format; receiving, by the network device, a content request from a virtual user-specific serving gateway (v-u-SGW) of a served UE; and forwarding the content in the ICN format to the v-u-SGW, wherein the v-u-SGW is adapted to translate the selected content from the ICN format to a user-specific format before relaying the translated content to the served UE. In an embodiment, the user-specific format comprises an internet protocol (IP) format.

With reference to the above discussions, there is provided an embodiment method for execution at a resource allocation logical entity. The method comprises receiving a virtual data plane logical topology associated with a service provided by nodes in a network, the topology received from a logical entity in the network provide software define topology services; mapping the received virtual data plane topology to a set of nodes in the network to create a physical data plane in the network for transportation of traffic associated with the service; and instructing a software defined per service logical entity to select transport characteristics for the traffic associated with the service over the physical data plane.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for establishing a virtual gateway, the method comprising:
   instantiating a virtual user specific serving gateway (v-u-SGW) on a network device in a wireless network domain, wherein the network device is assigned a host identifier (ID), wherein the v-u-SGW is assigned to a user equipment (UE) directly connected to the wireless network domain, and wherein the v-u-SGW is configured to translate content having an information-centric networking (ICN) format into a user-specific format, and relay the translated content to the UE directly connected to the wireless network domain; and
   assigning a first local virtual gateway ID to the v-u-SGW, wherein different virtual gateways on the network device are assigned different local virtual gateway IDs; and
   configuring routing parameters in a network so that packets specifying both the host ID and the first virtual gateway ID are forwarded to the v-u-SGW.

2. The method of claim 1, further comprising:
   instantiating a second virtual gateway on the network device; and
   assigning a second local virtual gateway ID to the second virtual gateway.

3. The method of claim 2, wherein the v-u-SGW and the second virtual gateway are associated with different UEs.

4. The method of claim 2, wherein packets specifying both the host ID and the second local virtual gateway ID are forwarded to the second virtual gateway.

5. The method of claim 1, wherein the wireless network domain is a radio access network.

6. The method of claim 1, wherein the wireless network domain is an evolved packet core (EPC) network.

7. An apparatus adapted to host a virtual gateway, comprising:
   a processor; and
   a non-transitory computer readable storage medium storing programming for execution by the processor, the programming including instructions to:
     instantiate a virtual user specific serving gateway (v-u-SGW) on a network device in a wireless network domain, wherein the network device is assigned a host identifier (ID), wherein the v-u-SGW is assigned to a user equipment (UE) directly connected to the wireless network domain, and wherein the v-u-SGW is configured to translate content having an information-centric networking (ICN) format into a user-specific format, and relay the translated content to the UE directly connected to the wireless network domain;
     assign a first local virtual gateway ID to the v-u-SGW, wherein different virtual gateways on the network device are assigned different local virtual gateway IDs; and
     configure routing parameters in a network so that packets specifying both the host ID and the first virtual gateway ID are forwarded to the v-u-SGW.

8. The apparatus of claim 7, wherein the programming further includes instructions to:

instantiate a second virtual gateway on the network device; and assign a second local virtual gateway ID to the second virtual gateway.

9. The apparatus of claim 8, wherein the v-u-SGW and the second virtual gateway are associated with different UEs.

10. The apparatus of claim 8, wherein packets specifying both the host ID and the second local virtual gateway ID are forwarded to the second virtual gateway.

11. The apparatus of claim 7, wherein the wireless network domain is a radio access network.

12. The apparatus of claim 7, wherein the wireless network domain is an evolved packet core (EPC) network.

13. A computer program product comprising a non-transitory computer readable storage medium storing programming, the programming including instructions to:

instantiate a virtual user specific serving gateway (v-u-SGW) on a network device in a wireless network domain, wherein the network device is assigned a host identifier (ID), wherein the v-u-SGW is assigned to a user equipment (UE) directly connected to the wireless network domain, and wherein the v-u-SGW is configured to translate content having an information-centric networking (ICN) format into a user-specific format, and relay the translated content to the UE directly connected to the wireless network domain;

assign a first local virtual gateway ID to the v-u-SGW, wherein different virtual gateways on the network device are assigned different local virtual gateway IDs; and configure routing parameters in a network so that packets specifying both the host ID and the first virtual gateway ID are forwarded to the v-u-SGW.

14. The computer program product of claim 13, wherein the programming further includes instructions to:

instantiate a second virtual gateway on the network device, wherein the v-u-SGW and the second virtual gateway are associated with different UEs; and assign a second local virtual gateway ID to the second virtual gateway, wherein packets specifying both the host ID and the second local virtual gateway ID are forwarded to the second virtual gateway.

15. The computer program product of claim 13, wherein the wireless network domain is either a radio access network or an evolved packet core (EPC) network.

* * * * *